US012424915B2

United States Patent
Druant et al.

(10) Patent No.: US 12,424,915 B2
(45) Date of Patent: Sep. 23, 2025

(54) ELECTRIC MACHINE WITH AXIALLY DISPLACEABLE ROTOR

(71) Applicant: Dana Automotive Systems Group, LLC, Maumee, OH (US)

(72) Inventors: Joachim Druant, Houthulst (BE); Thibault Devreese, Ghent (BE)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 357 days.

(21) Appl. No.: 18/051,837

(22) Filed: Nov. 1, 2022

(65) Prior Publication Data

US 2024/0146166 A1 May 2, 2024

(51) Int. Cl.
*H02K 21/02* (2006.01)
*H02K 7/08* (2006.01)
*H02K 7/116* (2006.01)

(52) U.S. Cl.
CPC ........... *H02K 21/024* (2013.01); *H02K 7/083* (2013.01); *H02K 7/116* (2013.01)

(58) Field of Classification Search
CPC .............................. H02K 21/024; H02K 7/116
See application file for complete search history.

(56) References Cited

U.S. PATENT DOCUMENTS

| 6,492,753 | B2 * | 12/2002 | Zepp | H02K 21/024 310/90 |
| 6,555,941 | B1 * | 4/2003 | Zepp | H02K 21/024 310/90 |
| 6,943,478 | B2 * | 9/2005 | Zepp | H02K 21/222 310/191 |
| 7,863,789 | B2 | 1/2011 | Zepp et al. | |
| 11,296,638 | B2 * | 4/2022 | McDonald | B63H 21/14 |
| 11,561,359 | B2 * | 1/2023 | Liu | F16M 11/06 |
| 12,011,995 | B2 * | 6/2024 | Rapp | F16D 11/10 |

FOREIGN PATENT DOCUMENTS

| DE | 102020114856 B3 * | 9/2021 | ........... H02K 21/024 |
| EP | 3358723 A1 | 8/2018 | |
| KR | 101748291 B1 | 6/2017 | |

* cited by examiner

*Primary Examiner* — Forrest M Phillips
(74) *Attorney, Agent, or Firm* — McCoy Russell LLP

(57) ABSTRACT

Methods and systems are provided for an electric machine. In example, an electric machine includes a stator that electromagnetically interacts with a rotor during electric machine operation. The electric machine further includes a first gear coupled to or included in a rotor shaft, a spring assembly coupled to a first side of the rotor and exerting a first axial force on the rotor, and a second gear that meshes with the first gear and exerts a second axial force that is opposite the first axial force, where a magnitude of the second axial force corresponds to a rotor torque.

20 Claims, 2 Drawing Sheets

ELECTRIC MACHINE WITH AXIALLY DISPLACEABLE ROTOR

TECHNICAL FIELD

The present disclosure relates to an electric machine with an axially displaceable rotor.

BACKGROUND AND SUMMARY

Electric motors are used in a variety of applications such as industrial machines, automotive applications, etc. In automotive applications, electric motors are used in electric drives as well as for other purposes. One type of electric motor that is currently used for electric drive in electric vehicles is a permanent magnet motor, in particular an alternating current (AC) permanent magnet motor. AC permanent magnetic motors may be used due to their synchronous response to an AC current (e.g., without slippage), in addition to reduced heat losses in comparison to AC induction motors.

However, the permanent magnets in the motors, decrease motor efficiency particularly at partial load. In some electric motors, back electromotive force (EMF) is generated in response to the changing magnetic flux through the rotor due to the rotation of the rotor, opposing the applied voltage to the conductive windings within the stator. The back EMF constrains the motor's peak power, thereby hampering motor performance.

U.S. Pat. No. 7,863,789 B2 to Zepp et al. discloses an electric motor with an actuator that actively adjusts the rotor position in an attempt to reduce back EMF. The actuator includes an actuation motor and a rod that are positioned external to the stator and linearly move the rotor when the vehicle transitions between motoring, generating, and idle modes.

The inventors have recognized several drawbacks with Zepp's motor. For instance, the active actuator increases the motor's size, complexity and chance of component degradation. Consequently, the applicability of Zepp's motor may be constrained.

In one example, the issues mentioned above may be addressed by an electric machine. The electric machine, in one example, includes a stator that electromagnetically interacts with a rotor during electric machine operation. The electric machine further includes a first gear coupled to or included in a rotor shaft and a spring assembly that is coupled to a first side of the rotor and exerting a first axial force on the rotor. The electric machine even further includes a second gear that meshes with the first gear and exerts a second axial force that is opposite the first axial force, where a magnitude of the second axial force corresponds to a rotor torque. In this way, the rotor's axial position with regard to the stator is passively adjusted. To elaborate, the spring assembly and the gears axially displace the rotor during machine operation to decrease back EMF at lower load conditions and reduce stator magnetic field, and thus stator iron loss. This results in a self-regulating system that achieves higher peak and continuous power and lower losses than previous electric machines. The passive adjustment of the rotor's axial position is less prone to degradation than previous systems that actively adjust rotor position. Further, the components used for passive rotor adjustment may be more compact than prior motors with active rotor axial adjustment.

Further in one example, to enable the second axial force to be exerted on the first gear, the gears may be helical gears. In such an example, the second gear may be included in a transmission. In this way, the torque generated by the electric machine correlates to the axial force on the rotor shaft which opposes the spring assembly.

Still further, in one example, the rotor shaft may include a slidable section and an axially fixed section that has a first bearing coupled thereto. In this way, the rotor shaft assembly accommodates for the axial movement of the rotor during machine operation.

It should be understood that the summary above is provided to introduce in a simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The systems described herein relate to an electric machine which self regulates the axial position of a rotor in relation to the stator during machine operation to achieve higher peak and continuous power and lower losses than previous electric machines. To achieve the self-regulating rotor position, the electric machine includes a spring assembly coupled to a rotor core and a gear (e.g., helical gear) that is coupled to or formed in a slidable rotor shaft. The gear meshes with a gear in a downstream system, such as a transmission. The interaction between the gears allows an axial force that opposes the spring force generated by the spring assembly to be altered based on machine torque. In this way, the rotor is moved axially out of alignment with the stator during lower torque conditions.

Figure 1A:
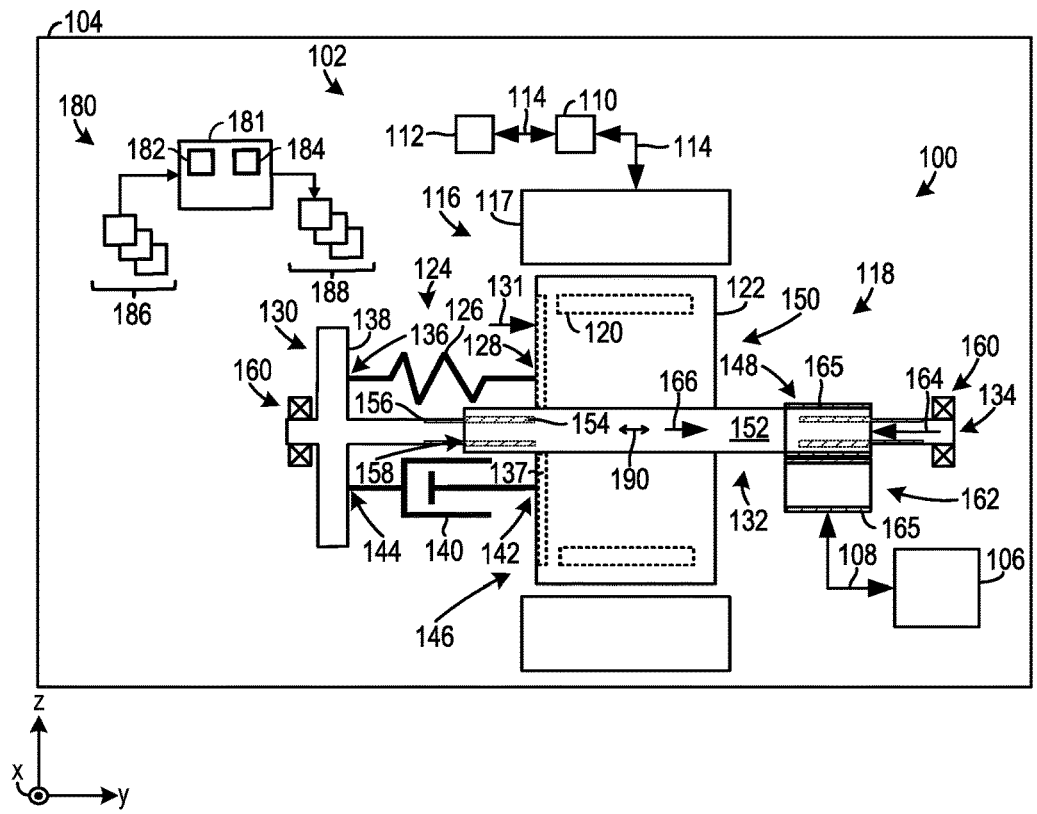
FIG. 1A shows a cross-sectional view of an electric machine in a first configuration.
Figure 1B:
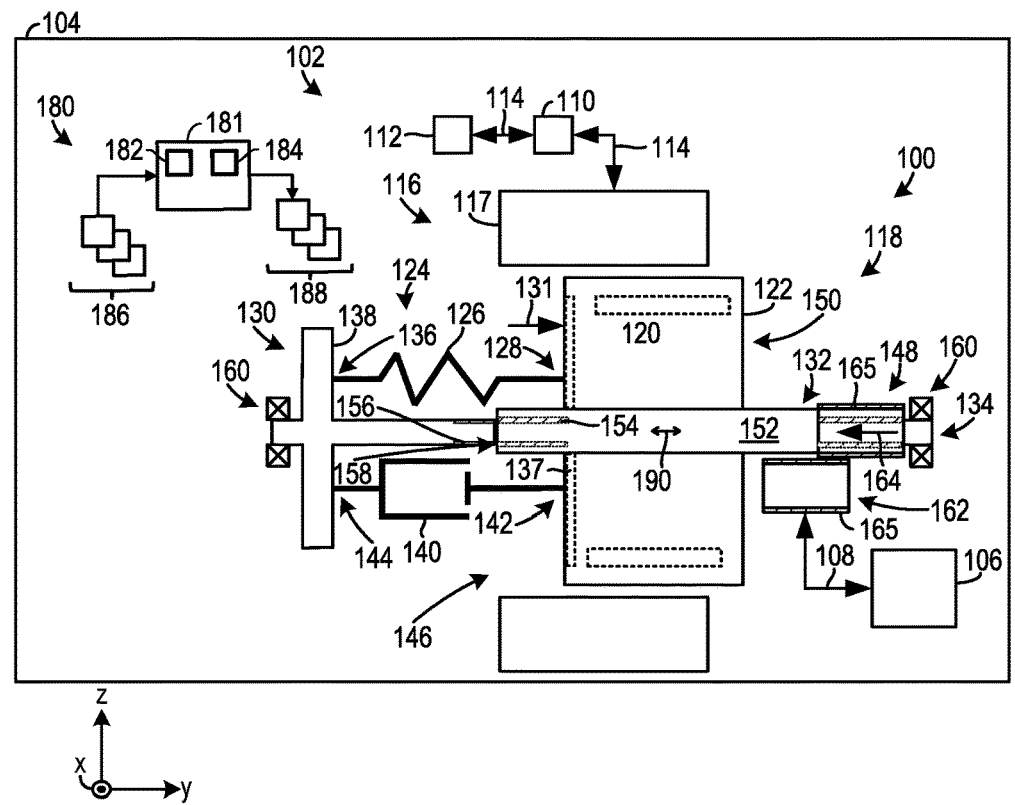
FIG. 1B shows a cross-sectional view of the electric machine in a second configuration.

FIGS. 1A and 1B show an illustration of an electric machine 100. The electric machine 100 may be a motor-generator that generates mechanical power, as well as electric power during a regeneration mode, in some cases.

The electric machine 100 may be used in a variety of systems. Specifically, in one example, the electric machine 100 may be included in an electric drive 102 (e.g., electric drive system) of an electric vehicle (EV) 104. The EV may be an all-electric vehicle or a hybrid electric vehicle. In these examples, the vehicle may take a variety of forms in different embodiments, such as a light, medium, or heavy duty vehicles. Alternatively, the motor may be used in other suitable systems, such as systems in manufacturing facilities or other industrial settings, for instance.

The electric machine 100 may be designed to provide mechanical power to a downstream system 106. The mechanical power transfer between the electric machine 100 and the downstream system is denoted via arrow 108. In the electric vehicle example, the downstream system 106 may be a transmission. The transmission may include gears, clutches, shafts, and the like. As such, the transmission may be a multi-speed transmission, in one example. Alternatively, the electric machine 100 may be used in equipment other than a vehicle. As such, the downstream system may take another form, in other examples.

The electric machine 100 may be an alternating current (AC) electric machine, in one example. In such an example, the electric machine 100 is electrically coupled to an inverter 110 which is electrically coupled to an energy storage device 112 (e.g., one or more traction batteries, capacitors, fuel cells, combinations thereof, and the like). These electrical connections are denoted via arrows 114.

The electric machine 100 includes a stator 116 that electromagnetically interacts with a rotor 118 during machine operation. The electric machine 100 may be a permanent magnet type machine with permanent magnets 120 included in a core 122 of the rotor 118. Further, the stator 116 may at least partially circumferentially enclose the rotor and the electric machine may therefore be a radial flux electric machine. Additionally, the stator 116 includes a core 117 which may include winding extending therethrough.

The electric machine 100 further includes a spring assembly 124 (e.g., a spring-damper assembly) coupled to the rotor 118. Specifically, in the illustrated example, the spring assembly 124 is coupled to the rotor core 122. In particular, the spring assembly 124 includes a spring 126 coupled to the rotor core 122 at a first end 128 and to a flange 130 that radially extends from a rotor shaft 132 (e.g., an axially fixed section 134 of the rotor shaft) at a second end 136. The axially fixed section may rotate during machine use but have an unchanged axial position. One of the bearings 160 is shown coupled to the axially fixed section 134. However, other bearing arrangements are possible.

The spring 126 is coupled to an inboard surface 138 of the flange 130, in the illustrated example. Further, the spring 126, at the first end 128, may be coupled to a balancing plate 137 in the rotor 118. However, the spring may be attached to different components at one or both ends. For instance, the spring may be directly attached to the rotor core, in other examples. The spring may be a coil spring, an elastomeric spring, an air spring, combinations thereof, and the like. However, other spring assembly configurations have been contemplated. The spring 126 when compressed exerts an axial spring force 131 on the rotor 118 (e.g., the rotor core 122). When the rotor 118 is circumferentially enclosed by the stator 116, as shown in FIG. 1A, the spring is under compression.

The spring assembly 124 further includes a damper 140 in the illustrated example. In alternate examples, the damper may be omitted. The damper 140 is coupled to the rotor core 122 at a first end 142 and is coupled to the flange 130 at a second end 144. To elaborate, the damper 140 may be coupled to the balancing plate 137 in the rotor 118. The damper 140 may include a cylinder, valves, a dampening fluid, and the like.

The components in the spring assembly 124 such as the spring 126 and the damper 140 may be constructed out of non-magnetic material(s) to avoid electromagnetic interference. For instance, aluminum, polymers, and the like may be used to construct the housing and/or the internal componentry of the spring and/or damper. For instance, the housing of the spring and/or damper may be constructed out of aluminum and/or elastomeric material may be used internally within the spring. In other examples, the spring and damper may use air and/or oil chamber(s) to provide the spring and damping functionality. It will be appreciated that in one example, the natural spring frequency may be selected to avoid correspond between frequency of the cyclical loading during machine operation. Thus, the natural spring frequency may be selected such that it is not equal to or a multiple of the loading frequencies.

Figure 2:
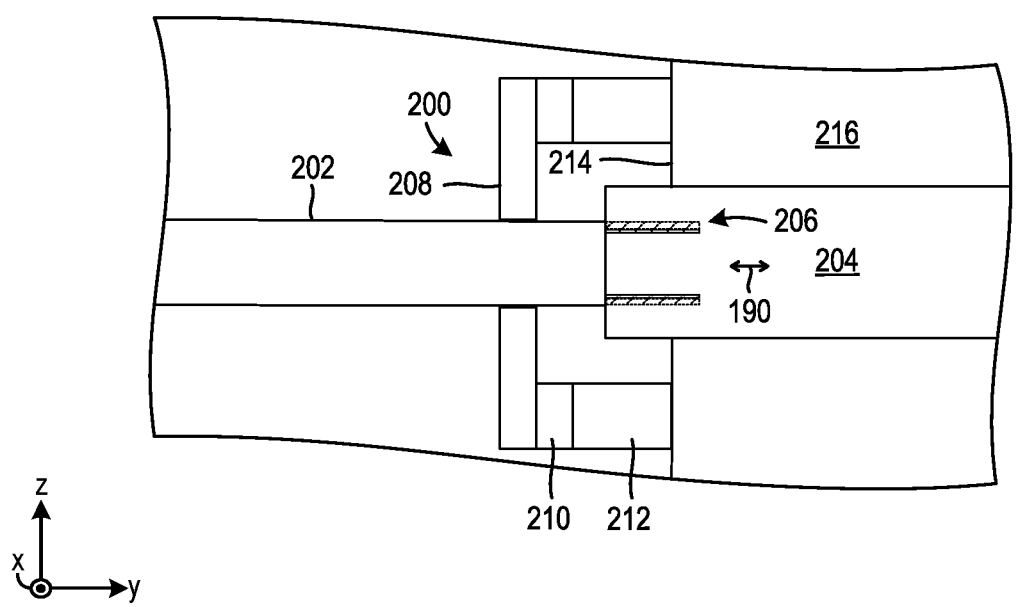
FIG. 2 shows an example of a spring and damper assembly.

Further, in one example, the spring and damper may be constructed as single unit or may be coaxially arranged. FIG. 2 shows an example of a spring and damper assembly 200 that is included in an electric machine. The electric machine includes an inner rotor shaft 202 and an outer rotor shaft 204 that are each splined to enable axial translation of the outer shaft. The inner shaft 202 may be held in place axially via bearings that permit rotation of the shaft but inhibit axial movement thereof. However, due to the splined connection 206 between the inner and outer rotor shafts, the outer shaft is capable of axially translating along the inner shaft. A radial flange 208 may be coupled to or formed in the inner rotor shaft 202. A damper 210 may be coupled to the radial flange 208 and a spring 212 may be coupled to the damper. However, in alternate examples, the spring may be coupled to the flange and the damper may be coupled to the spring. In the illustrated example, the spring and the damper are annularly shaped. The annular shape may reduce rotational imbalances in the machine. The spring may therefore use wave washers, disc washers, annular elastomers, and/or an annular air spring assembly. However, the spring and/or damper may have other contours in alternate examples. Further, the spring 212 may be coupled to an annular face 214 of a rotor core 216. In this way, the spring and damper assembly 200 may be efficiently incorporated into the machine, if desired.

Returning to FIG. 1A, the spring 126 and the damper 140 may be positioned outboard of a first axial side 146 of the rotor core 122. A gear 148 (e.g., helical gear) may be positioned outboard of a second axial side 150 of the rotor core 122. The gear 148 is coupled to or integrally formed in a slidable rotor shaft section 152 which is coupled to the rotor core 122. The rotor shaft 132 further includes the axially fixed section 134. To enable the slidable rotor shaft section 152 to move in relation to the axially fixed rotor shaft section 134 the slidable section may be splined to the axially fixed section 134. As such, the slidable section 152 may include splines 154 on an inner surface and the axially fixed section 134 may include splines 156 on an outer surface, in one example. The splines may include teeth and recesses positioned between the teeth. The splines may be parallel splines, serrated splines, involute splines, and the like in some cases. In such an example, the axially fixed section 134 extends through an opening 158 of the slidable section 152. However, other rotor shaft configurations may be used in other examples. For instance, the slidable section may extend through an opening in the axially fixed section and the splines may be positioned on an outer surface of the slidable section and an inner surface of the axially fixed section.

Bearings 160 (e.g., a pair of bearings) may be coupled to opposing ends of the stationary rotor shaft section 134. The bearings 160 may be thrust bearing to allow thrust loads to be reacted by the bearings. As such, the bearings 160 may include tapered roller elements and inner and outer races. The bearings 160 may be coupled to a stationary component such as a machine housing.

The gear 148 meshes with a gear 162 via teeth 165 on both gears. The gear 162 is shown mechanically coupled to the downstream system 106 (e.g., the transmission). However, conceptually the gear 162 may be included in the transmission.

The teeth 165 may be helical teeth and the gears 148, 162 may therefore be helical gears. The angle of the helical gear cut may be 5°-25°, in one example. Using gears with cuts within this angular range may generate a desired reaction axial force that allows the rotor to move outward from the stator during low torque operation, in some cases, thereby increase machine efficiency. Torque transferred between the gears 148, 162 generates a reaction axial force 164 that the gear 162 exerts on the gear 148. The reaction axial force 164 may therefore be proportional to the torque generated by the electric machine 100. As such, the reaction axial force 164 may be transferred to the slidable section 152 of the rotor shaft 132 in an opposing direction as the spring force 131. As such, relative magnitudes of these forces dictates the axial position of the rotor 118.

FIG. 1A shows the electric machine 100 operating under a higher torque condition and FIG. 1B shows the electric machine operating under a lower torque condition. Under the higher torque condition shown in FIG. 1A, the reaction axial force 164 on the rotor compresses the spring 126. The spring constant of the spring 126 may be selected based on the expected operating conditions in the system such as the motor torque range, the profile of the teeth 165 of the gears 148, 162, and the like. Therefore, the spring constant of the spring 126 may be selected to enable the rotor to travel into a position where the stator circumferentially encloses the rotor under higher load conditions and then moved further out of circumferential alignment with the stator, as the load decreases. To elaborate, a dynamic analysis may be performed on an application specific basis in which axially forces acting the rotor are determined (e.g., the helical gear force and magnetic forces). Based on the forces, the spring constant may then be defined.

Conversely, under the lower torque condition shown in FIG. 1B, the spring force 131 pushes the rotor 118 in an axial direction 166 such that at least a portion of the rotor core 122 is not circumferentially surrounded by the stator. FIG. 1B shows the gears 148, 162 only partially overlapping. However, the partial overlap may not be an issue since the machine is under lower torque.

Thus, the rotor 118 is displaced axially via two forces: the spring force 131 and the gear reaction force 164. Thus, the spring force urges the rotor out of the stator and the gear reaction force pushes the rotor back into the stator. As such, if no torque is applied (no-load), the rotor 118 is pushed out of the stator 116. As a result, no-load losses (e.g., iron losses) are significantly reduced. Further, when the rotor is moved axially outward from the stator, the back EMF is reduced, so no field weakening is demanded at high speed. Consequently, the copper loss at higher speeds are reduced and the likelihood of system degradation is reduced which may allow an active short circuit at higher speed to be avoided, if desired. As the rotor torque increases, the rotor is pushed back into the stator via the gear reaction force. Thus, the rotor length (e.g., active length) within the stator core 117 is dependent upon rotor torque. The higher the torque, the further the rotor moves back into the stator. As a result, lower current is demanded for the same torque if the active length is higher, thereby increasing machine performance.

An axis system is provided in FIG. 1A, as well as in FIGS. 1B and 2, for reference. The z-axis may be a vertical axis (e.g., parallel to a gravitational axis), the x-axis may be lateral axis (e.g., a horizontal axis), and/or the y-axis may be a longitudinal axis, in one example. However, the axes may have other orientations, in other examples. Additionally, the machine's rotational axis 190 is provided in FIGS. 1A-1B and 2 for reference.

FIG. 1A shows a control sub-system 180 with a controller 181 that may further be included in the system. The controller may include a processor 182 and memory 184 with instructions stored therein that, when executed by the processor, cause the controller to adjust machine's speed/torque. The processor may include a microprocessor unit and/or other types of circuits. The memory may include known data storage mediums, such as random access memory, read only memory, keep alive memory, combinations thereof, and the like.

The controller 181 may receive various signals from sensors 186 positioned in the system and the electric machine 100. Conversely, the controller 181 may send control signals to various actuators 188 at different locations in the system based on the sensor signals. For instance, the controller 181 may send control signals to an inverter coupled to the electric machine 100 and in response to receiving the command signals, the inverter may be adjusted to alter electric machine speed. Other controllable components in the system may be operated in a similar manner with regard to sensor signals and actuator adjustment.

FIGS. 1A, 1B, and 2 provide for a method for operation of an electric machine where the electric machine is controlled to rotate the rotor. During rotor rotation, the spring-damper assembly and the helical gearing in the system passively interact (without control command inputs) to alter the axial position of the rotor in relation to the stator based on the magnitude of the rotor torque. During higher load conditions the rotor moves into an inline position in relation to the stator and during lower load conditions, the rotor moves out of line in relation to the stator. In other words, the rotor moves at least partially axially outboard in relation to the stator as the rotor torque decreases.

FIGS. 1A, 1B, and 2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Components positioned coaxial, parallel, and perpendicular to one another may be referred to as such.

The invention will be further described in the following paragraphs. In one aspect, an electric machine is provided that comprises a stator that electromagnetically interacts with a rotor during electric machine operation; wherein the rotor includes a rotor shaft; a first gear coupled to or included in the rotor shaft; a spring assembly coupled to a first side of the rotor and exerting a first axial force on the rotor; and a second gear that meshes with the first gear and exerts a second axial force that is opposite the first axial force; wherein a magnitude of the second axial force corresponds to a rotor torque.

In another aspect, an electric motor in a vehicle system is provided that comprises a stator that electromagnetically interacts with a rotor during electric machine operation; wherein the rotor includes a rotor shaft and a rotor core that is coupled to the rotor shaft; a first helical gear coupled to or included in the rotor shaft; a spring-damper assembly coupled to the rotor; and a second helical gear that meshes with the first helical gear; wherein the spring-damper assembly and the first and second helical gears are configured to axially displace the rotor based on operating conditions.

In yet another example, a permanent magnet electric motor for an electric vehicle is provided that comprises a stator that electromagnetically interacts with a rotor during electric machine operation; wherein the rotor includes a rotor shaft and a rotor core that is coupled to the rotor shaft and includes a plurality of permanent magnets; a first helical gear coupled to or included in the rotor shaft; a spring-damper assembly coupled to the rotor and exerting an axial force thereon; and a second helical gear that meshes with the first helical gear and is included in a transmission; wherein the second helical gear exerts a second axial force on the rotor that opposes the first axial force and is dependent upon a rotor torque.

In any of the aspects or combinations of the aspects, the first gear and the second gear may be helical gears.

In any of the aspects or combinations of the aspects, the rotor shaft may include a slidable section and an axially fixed section that has a first bearing coupled thereto.

In any of the aspects or combinations of the aspects, the slidable section may be splined to the axially fixed section.

In any of the aspects or combinations of the aspects, the electric machine may further comprise a second bearing coupled to the axially fixed section, wherein the first bearing and the second bearing are positioned on opposing sides of a rotor core.

In any of the aspects or combinations of the aspects, the electric machine may further comprise a flange that radially extends from the axially fixed section of the rotor shaft, wherein the spring assembly includes a spring and a damper coupled to the flange.

In any of the aspects or combinations of the aspects, the spring and the damper may be coupled to a rotor core in the rotor.

In any of the aspects or combinations of the aspects, the electric machine may be a radial flux electric machine.

In any of the aspects or combinations of the aspects, the electric machine may be a multi-phase electric machine.

In any of the aspects or combinations of the aspects, the rotor may include one or more permanent magnets.

In any of the aspects or combinations of the aspects, the second gear may be included in a transmission.

In any of the aspects or combinations of the aspects, the rotor shaft may include an inner axially fixed section that is splined to an outer axially displaceable section.

In any of the aspects or combinations of the aspects, the electric motor may further comprise a pair of bearings coupled to opposing sides of the inner axially fixed section.

In any of the aspects or combinations of the aspects, the outer axially displaceable section may be coupled to the rotor core.

In any of the aspects or combinations of the aspects, the electric motor may be a permanent magnet electric motor.

In any of the aspects or combinations of the aspects, the rotor shaft may include an axially fixed section that is splined to an axially displaceable section and wherein the electric motor may further comprise a pair of bearings coupled to opposing sides of the inner axially fixed section.

In any of the aspects or combinations of the aspects, the spring damper assembly may include a spring and a damper positioned radially outward from the axially displaceable section of the rotor shaft.

In any of the aspects or combinations of the aspects, when the rotor torque may be zero or approaching zero the rotor core may be positioned axially outside of the stator.

In another representation, a permanent magnet alternating current (AC) electric motor-generator is provided that comprises an axially displaceable rotor assembly that includes a spring-damper device coupled to a rotor core that is coupled to an outer rotor shaft that is splined to an inner rotor shaft that has as helical gear coupled thereto or incorporated therein.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to vehicle systems that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine, comprising:
a stator that electromagnetically interacts with a rotor during electric machine operation;

wherein the rotor includes a rotor shaft;
a first gear directly coupled to or included in the rotor shaft;
a spring assembly coupled to a first axial side of the rotor and exerting a first axial force on the rotor; and
a second gear that meshes with the first gear and exerts a second axial force that is opposite the first axial force;
wherein a magnitude of the second axial force corresponds to a rotor torque.

2. The electric machine of claim 1, wherein the first gear and the second gear are helical gears, and wherein the first gear is integrally formed in a slidable section of the rotor shaft.

3. The electric machine of claim 1, wherein the rotor shaft includes a slidable section and an axially fixed section that has a first bearing coupled thereto.

4. The electric machine of claim 3, wherein the slidable section is splined to the axially fixed section.

5. The electric machine of claim 4, further comprising a second bearing coupled to the axially fixed section, wherein the first bearing and the second bearing are positioned on opposing sides of a rotor core.

6. The electric machine of claim 3, further comprising a flange that radially extends from the axially fixed section of the rotor shaft, wherein the spring assembly includes a spring and a damper, and wherein a first end of the damper is coupled to a rotor core in the rotor and a second end of the damper is coupled to the flange.

7. The electric machine of claim 6, wherein the spring and the damper are annularly shaped.

8. The electric machine of claim 1, wherein the electric machine is a radial flux electric machine.

9. The electric machine of claim 1, wherein the electric machine is a multi-phase electric machine.

10. The electric machine of claim 1, wherein the rotor includes one or more permanent magnets.

11. The electric machine of claim 1, wherein the second gear is included in a transmission.

12. An electric motor in a vehicle system, comprising:
a stator that electromagnetically interacts with a rotor during electric machine operation;
wherein the rotor includes a rotor shaft and a rotor core that is coupled to the rotor shaft;
a first helical gear directly coupled to or included in the rotor shaft;
a spring-damper assembly coupled to the rotor; and
a second helical gear that meshes with the first helical gear;
wherein the spring-damper assembly and the first and second helical gears are configured to passively interact to axially displace the rotor based on operating conditions.

13. The electric motor of claim 12, wherein the rotor shaft includes an inner axially fixed section that is splined to an outer axially displaceable section.

14. The electric motor of claim 13, further comprising a pair of bearings coupled to opposing sides of the inner axially fixed section.

15. The electric motor of claim 13, wherein the outer axially displaceable section is coupled to the rotor core.

16. The electric motor of claim 12, wherein the electric motor is a permanent magnet electric motor.

17. A permanent magnet electric motor for an electric vehicle, comprising:
a stator that electromagnetically interacts with a rotor during electric machine operation;
wherein the rotor includes a rotor shaft and a rotor core that is coupled to the rotor shaft and includes a plurality of permanent magnets;
a first helical gear coupled to or included in the rotor shaft;
a spring-damper assembly coupled to the rotor and exerting a first axial force thereon; and
a second helical gear that meshes with the first helical gear and is included in a transmission;
wherein the second helical gear exerts a second axial force on the rotor that pushes the rotor axially into the stator, opposes the first axial force, and is dependent upon a rotor torque.

18. The permanent magnet electric motor of claim 17, wherein the rotor shaft includes an axially fixed section that is splined to an axially displaceable section and wherein the permanent magnet electric motor further comprises a pair of bearings coupled to opposing sides of the axially fixed section.

19. The permanent magnet electric motor of claim 18, wherein the spring-damper assembly includes a spring and a damper positioned radially outward from the axially displaceable section of the rotor shaft.

20. The permanent magnet electric motor of claim 17, wherein when the rotor torque is zero or approaching zero the rotor core is positioned axially outside of the stator, and wherein the first helical gear and the second helical gear each have cuts within an angular range of 5°-25°.

* * * * *